(12) United States Patent
Amano

(10) Patent No.: US 11,495,202 B2
(45) Date of Patent: Nov. 8, 2022

(54) 3D-PRINTED ARTICLE WITH TRANSITIONAL METASTRUCTURES

(71) Applicant: Konica Minolta Business Solutions U.S.A., Inc., San Mateo, CA (US)

(72) Inventor: Jun Amano, Hillsborough, CA (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 548 days.

(21) Appl. No.: 16/557,464

(22) Filed: Aug. 30, 2019

(65) Prior Publication Data

US 2021/0065671 A1    Mar. 4, 2021

(51) Int. Cl.

| | |
|---|---|
| *G10K 11/168* | (2006.01) |
| *B33Y 80/00* | (2015.01) |
| *B29C 64/393* | (2017.01) |
| *B33Y 50/02* | (2015.01) |
| *B29C 64/10* | (2017.01) |
| *B33Y 10/00* | (2015.01) |
| *B29C 64/386* | (2017.01) |
| *B33Y 50/00* | (2015.01) |

(52) U.S. Cl.
CPC ............ *G10K 11/168* (2013.01); *B29C 64/10* (2017.08); *B29C 64/386* (2017.08); *B29C 64/393* (2017.08); *B33Y 10/00* (2014.12); *B33Y 50/00* (2014.12); *B33Y 50/02* (2014.12); *B33Y 80/00* (2014.12)

(58) Field of Classification Search
CPC ........ B33Y 10/00; B33Y 50/00; B29C 64/386
See application file for complete search history.

(56) References Cited

U.S. PATENT DOCUMENTS

| 8,528,862 | B2 | 9/2013 | Liguore et al. |
| 10,232,549 | B2 | 3/2019 | Hayes et al. |
| 2017/0072638 | A1* | 3/2017 | Hayes ............... B64C 1/066 |

FOREIGN PATENT DOCUMENTS

| CN | 109970021 | * | 7/2019 |
| CN | 109970021 A | | 7/2019 |

OTHER PUBLICATIONS

First Office Action issued in the counterpart Chinese Patent Application No. 202010883851.0, dated Feb. 28, 2022 (22 pages).

(Continued)

*Primary Examiner* — Nathan T Leong
(74) *Attorney, Agent, or Firm* — Osha Bergman Watanabe & Burton LLP

(57) ABSTRACT

A single-step method of generating a three dimensional (3D) printed article includes: selecting a first metastructure and a second metastructure; designing and constructing a first transitional metastructure that transitions from the first metastructure to the second metastructure; depositing a first layer comprising the first metastructure; seamlessly connecting the first and first transitional metastructures by depositing a first transitional layer comprising the first transitional metastructure on the first layer; and seamlessly connecting the first transitional and second metastructures by depositing a second layer comprising the second metastructure on the first transitional layer.

8 Claims, 9 Drawing Sheets

(56) References Cited

OTHER PUBLICATIONS

Panagiotis Vogiatzis et al., "Topology optimization of multi-material negative Poisson's ratio metamaterials using a reconciled level set method"; Computer-Aided Design, vol. 83; pp. 15-32; Feb. 2017 (18 pages).
Frieder Lucklum et al., "Design and Fabrication Challenges for Millimeter-Scale Three-Dimensional Phononic Crystals"; Crystals 2017, vol. 11, No. 348; pp. 1-13; Nov. 15, 2017 (13 pages).
Kathryn H. Matlack et al., "Composite 3D-printed metastructures for low-frequency and broadband vibration absorption"; Proceedings of the National Academy of Sciences of the United States of America, vol. 113, No. 30; pp. 8386-8390; Jul. 26, 2016 (5 pages).
Aniwaa, "Categories of 3D Printing Technologies"; Accessed on Aug. 29, 2019 via Web URL: <https://www.aniwaa.com/3d-printing-technologies/> (14 pages).
Second Office Action issued in the counterpart Chinese Patent Application No. 202010883851.0, dated Aug. 10, 2022 (18 pages).

* cited by examiner

3D-PRINTED ARTICLE WITH TRANSITIONAL METASTRUCTURES

BACKGROUND

Three dimensional (3D) printing or additive manufacturing has gained popularity in recent years due to its design flexibility and usage of light-weight structures for vehicles (e.g., automobiles and aircraft). For example, a 3D-printed acoustic barrier (e.g., to reduce the propagation of mechanical waves, engine noise, road noise, or noise from external airflow) may be designed and fabricated to provide an optimal acoustic environment within a vehicle. However, such acoustic barriers fabricated by conventional 3D-printing technologies may lack the internal structure to function as a mechanically-strong barrier (e.g., to support a load or withstand an impact). In general, reinforcing the 3D-printed sound barrier with an external support (e.g., laminating or adhering a reinforcement panel onto the 3D-printed sound barrier) introduces undesirable increases in fabrication cost, time, supplies, and the weight of the final product.

SUMMARY

In general, one or more embodiments the invention relate to a method for generating a three dimensional (3D) printed article. The method includes: selecting a first metastructure and a second metastructure; designing and constructing a first transitional metastructure that transitions from the first metastructure to the second metastructure; depositing a first layer comprising the first metastructure; seamlessly connecting the first and first transitional metastructures by depositing a first transitional layer comprising the first transitional metastructure on the first layer; and seamlessly connecting the first transitional and second metastructures by depositing a second layer comprising the second metastructure on the first transitional layer.

In general, one or more embodiments of the invention relate to a 3D-printed article. The 3D-printed article comprises: a first layer comprising a first metastructure; a first transitional layer deposited on the first layer and that comprises a first transitional metastructure that is seamlessly connected to the first metastructure; and a second layer deposited on the first transitional layer and that comprises a second metastructure that is seamlessly connected to the first transitional metastructure. The first transitional metastructure transitions from the first metastructure to the second metastructure.

Other embodiments of the invention will be apparent from the following description and the appended claims.

DETAILED DESCRIPTION

Figure 1:
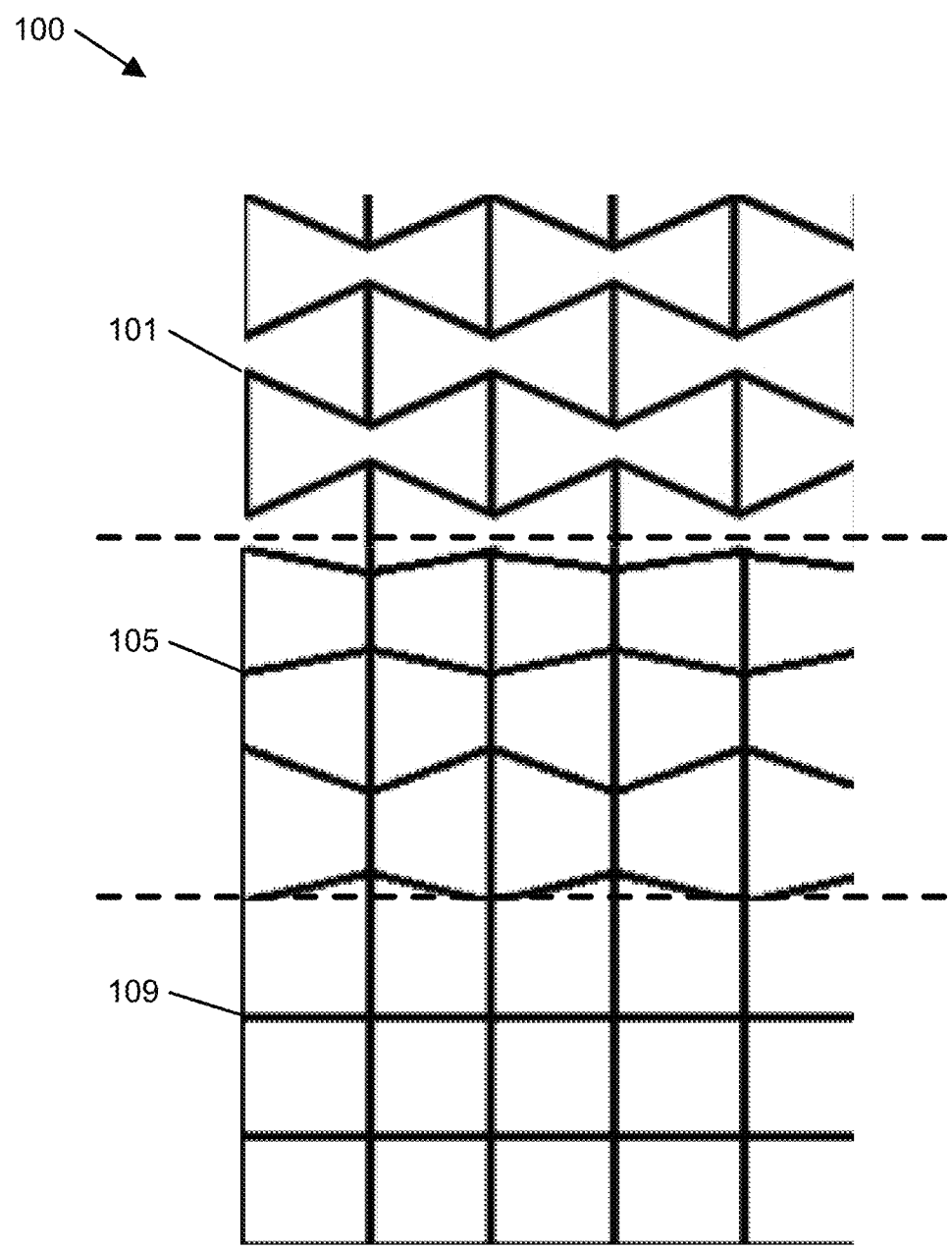
FIG. 1 shows a 3D-printed article in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and succeed (or precede) the second element in an ordering of elements.

In general, embodiments of the invention provide a method for generating a 3D-printed article comprising a continuous gradient transitional layer seamlessly connected to each adjacent layer of the 3D-printed article. For example, in one or more embodiments, the 3D-printed article may be a mechanically-strong and light-weight sound barrier. The 3D-printed article may include: a first layer comprising an auxetic metastructure to provide the 3D-printed article with structural strength; and a second layer comprising an acoustic metastructure (i.e., a sound barrier) to provide the 3D-printed article with predetermined acoustic characteristics (e.g., characteristics to filter out an undesirable frequency band from an environment of the 3D-printed article). By designing and 3D-printing a continuous gradient transitional metastructure (i.e., a transitional layer) between each layer of the 3D-printed article, the seamless layers are constructed without any sharp boundaries and interfaces (i.e., the possibility of the layers delaminating at the boundaries and interfaces may be eliminated) and the 3D-printed article can be fabricated in a single step. This advantageously eliminates the cost, materials, and time required to bond or laminate separate articles. Furthermore, the design of the metastructures in each layer of the 3D-printed article may be achieved by computer-aided design with the utilization of machine learning and uploaded directly to 3D-printing tools (e.g., extruded filament, powder fusion, liquid resin based 3D printers).

FIG. 1 shows a 3D-printed article 100 in accordance with one or more embodiments of the invention. The 3D-printed article 100 includes, for example, a first layer 101 with a first metastructure, a first transitional layer 105 with a first transitional metastructure, and a second layer 109 with a second metastructure, which are discussed in detail below.

In one or more embodiments, the second layer 109 is structurally distinct from the first layer 101, and the first transitional layer 105 is disposed between the first layer 101 and the second layer 109. These layers may be a cross-section (in any direction), a portion of a cross-section, a repeating unit cell, or an irregular region of the 3D-printed article. In other words, these layers may be any physical portion of a 3D-printed article and are not restricted to a particular plane, orientation, or region of the 3D-printed article.

The first metastructure of the first layer 101 may have a predetermined mechanical property (e.g., a required stiffness, strength, hardness). The first metastructure may be a repeating structure with a unit cell. A typical unit cell volume of the first metastructure may range from 1 mm$^3$ to 100 cm$^3$.

For example, the first metastructure may be an auxetic metastructure with a negative Poisson ratio. When a uniaxial force is applied in a longitudinal direction, the Poisson ratio is the ratio of the strain in a transverse direction (perpendicular to the longitudinal direction) to the strain in the longitudinal direction (Poisson ratio, $v=-\varepsilon_{trans}/\varepsilon_{long}$).

In other words, when stretched along the longitudinal direction, an auxetic structure becomes thicker in the direction perpendicular to the direction of the applied force. Conversely, when compressed along the longitudinal direction, the auxetic structure becomes thinner in the direction perpendicular to the direction of the applied force. In general, a negative Poisson ratio may be achieved by designing the internal metastructure of the auxetic structure to deform when the longitudinal force is applied.

In one or more embodiments, the first metastructure (e.g., an application-specific mechanical strength 3D auxetic metastructure) may be designed and constructed using a topological optimization process using a predetermined Poisson ratio and a predetermined volume constant as system parameters. Thus, the mechanical characteristics of the first layer 101 may be obtained by prioritizing parameters related to a layer thickness, a volume fill factor, and a material of the first metastructure.

The second metastructure of the second layer 109 may be structurally distinct from the first metastructure. The second metastructure may be designed with a predetermined acoustic property (e.g., a sound scattering, absorbing, or resonant behavior). For example, the second metastructure may be an acoustic metastructure (e.g., a phononic crystal with a periodic structure) with a phononic response curve (e.g., a phononic bandgap). In other words, the acoustic metastructure may be designed to interact with (e.g., absorb, scatter, amplify) mechanical waves (e.g., audible acoustic waves (1 Hz-10 kHz), ultrasonic waves (>10 kHz), mechanical vibrations), and has a phononic bandgap tuned to a predetermined frequency band. The second metastructure may be a lattice (e.g., cubic lattice) but is not limited to such a 3D structure. A typical unit cell volume of the second metastructure may range from 1 mm$^3$ to 100 cm$^3$.

For example, in a vehicle (e.g., automobile, aircraft, boat), low frequency vibrations (e.g., from an engine, road noise, aerodynamics, turbulence, waves) may cause discomfort for passengers. The second metastructure may be an acoustic metastructure that overlaps the low frequency range (e.g., <1 kHz) to improve or optimize the acoustic environment within the vehicle.

In one or more embodiments, the second metastructure may be designed and constructed using a physical model-based optimization process (e.g., sound scattering, resonance-based models). For example, the unit cell volume of the second metastructure may be designed with a phononic response curve that overlaps the low frequency range of the undesirable noise. Furthermore, the acoustic characteristics of the second layer 109 may be obtained by prioritizing parameters related to a layer thickness, a volume fill factor, and a material of the second metastructure.

In one or more embodiments, the first transitional layer 105 comprises a first transitional metastructure with a structure that transitions from the first metastructure to the second metastructure. The connections from the first metastructure to the first transitional metastructure and from the first transitional metastructure to the second metastructure are seamless.

In one or more embodiments, the transitional layer may be designed and constructed using machine learning (i.e., the transitional layer has a structure that is a machine-learning-constructed design). Generative machine learning is implemented through reinforcement learning, a class of machine learning algorithm that attempts to find the optimal way to accomplish a particular goal, improve performance on a specific task, or optimize one or more prioritized parameters of the system. Reinforcement learning may repeatedly model and adjust some or all system parameters (e.g., a layer thickness, a volume fill factor, a material) to optimize one or more of the system parameters.

In this application, a seamless connection means that a physical boundary between adjacent layers (e.g., between the first transitional layer 105 and each of the first layer 101 and the second layer 109) does not comprise an abrupt interface. For example, in FIG. 1, the physical boundary between the first transitional layer 105 and the first layer 101 (denoted by the upper broken line) is seamless because no physical barrier or interface exists between the first transitional metastructure and the first metastructure. Furthermore, a transition may still be seamless even when a physical component (e.g., a wall, protrusion, support beam) of a metastructure coincides with the physical boundary between adjacent layers. For example, the physical boundary of the first transitional layer 105 with the second layer 109 (denoted by the lower broken line) is also seamless even though part of the printed structure coincides with the physical boundary.

Furthermore, seamless means the physical boundary between adjacent layers does not comprise a bonding layer (e.g., a laminate layer, an adhesive bonding layer/film/particle) that is extrinsic to the 3D-printed metastructures of each of the layers 101, 105, and 109. For example, the first layer, the second layer, and the first transitional layer are connected without using post-processing lamination or post-processing bonding.

The first transitional metastructure (e.g., a gradient 3D transitional metastructure from auxetic to phononic unit cell structure) may be designed and constructed using generative machine learning based on the parameters and characteristics (e.g., layer thickness, volume fill factor, and material of each metastructure) of the first metastructure and the second metastructure.

Figure 2:
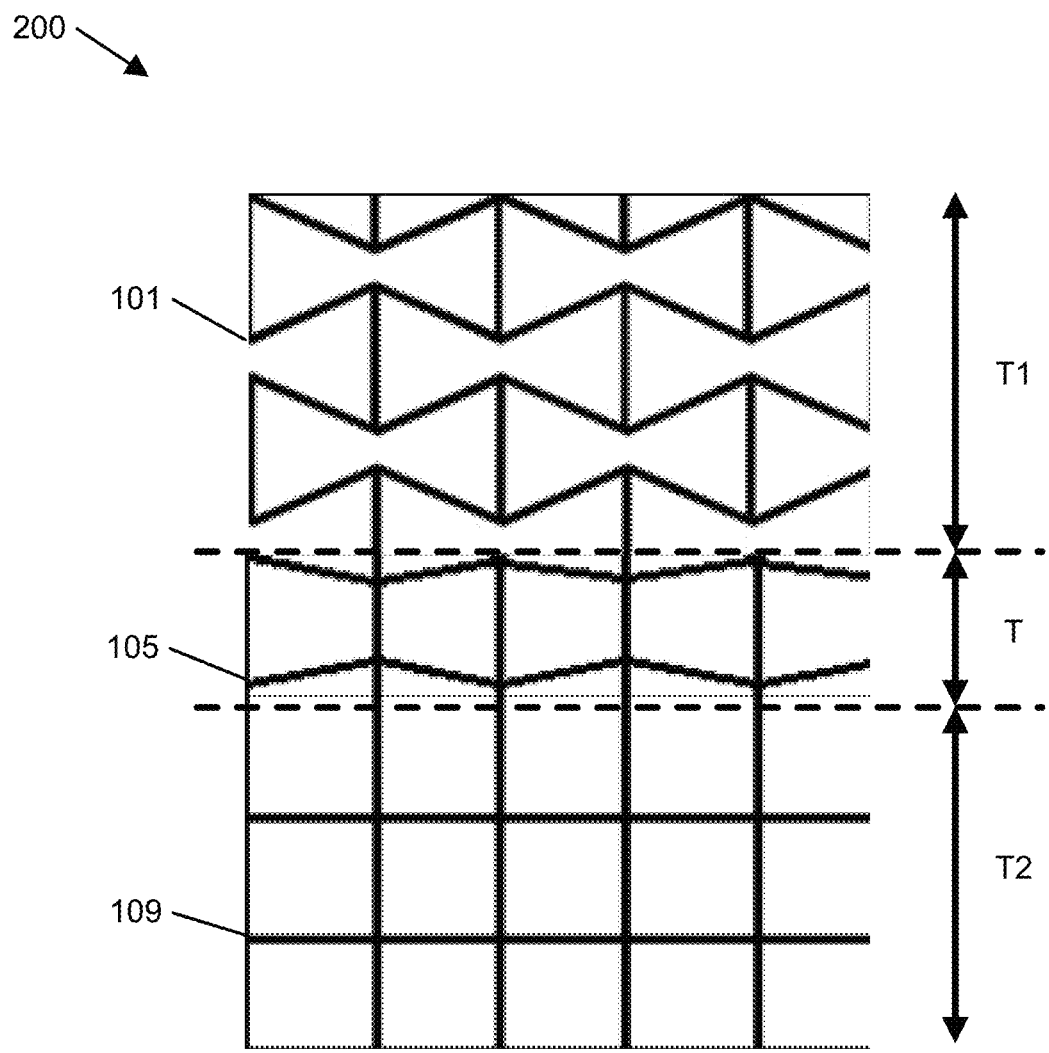
FIG. 2 shows a 3D-printed article in accordance with one or more embodiments of the invention.

FIG. 2 shows a 3D-printed article 200 in accordance with one or more embodiments of the invention where a minimum thickness T of the first transitional layer 105 is the highest prioritized parameter of the machine learning design process. The thickness T of the first transitional layer 105 may be less than the thickness T1 of the first layer 101 and/or the thickness T2 of the second layer 109. The 3D-printed article 200 may consist of only three layers (i.e., the first, second, and first transitional layers) and only three metastructures (i.e., the first, second, and first transitional metastructures).

Figure 3:
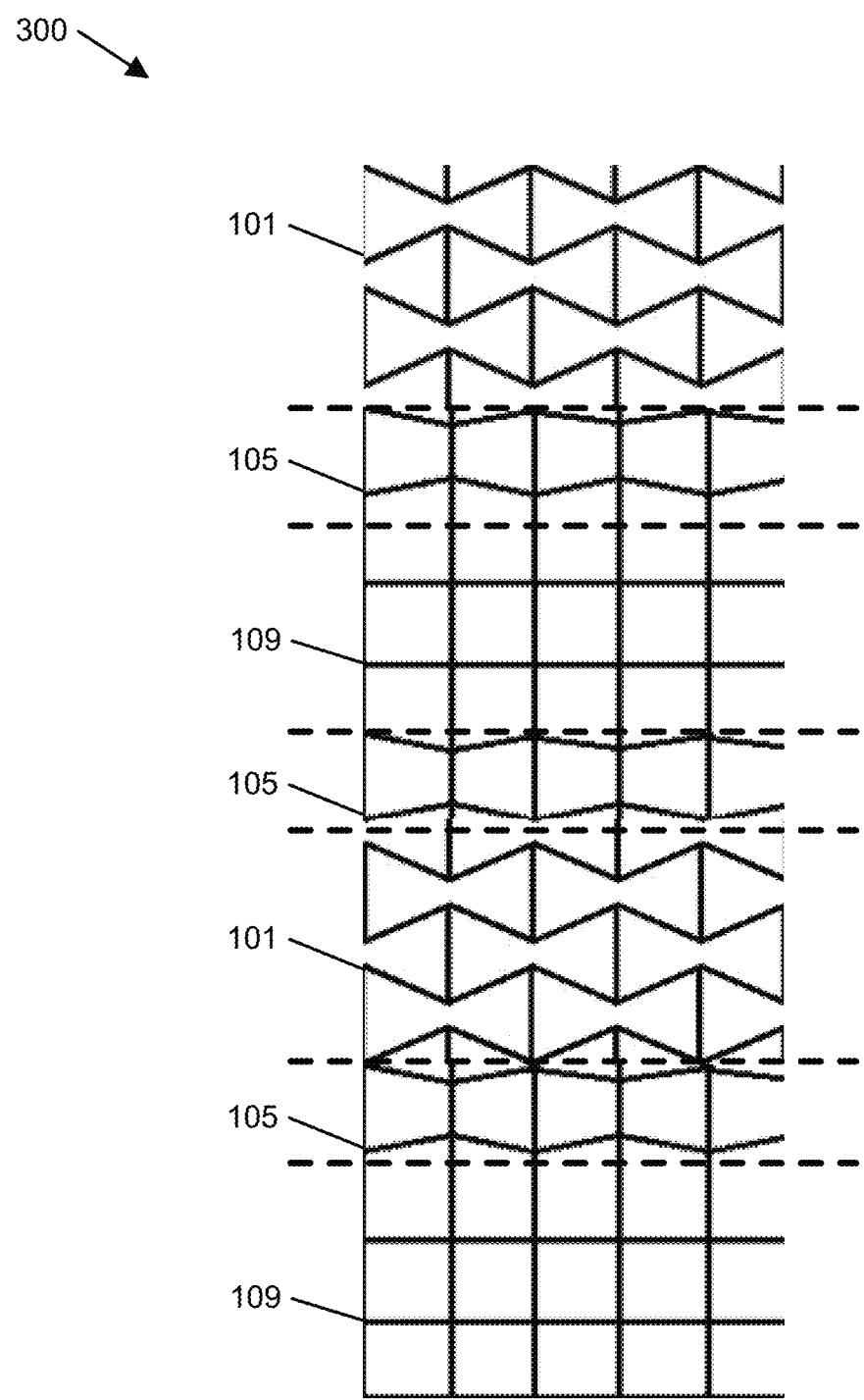
FIG. 3 shows a 3D-printed article in accordance with one or more embodiments of the invention.

FIG. 3 shows a 3D-printed article 300 in accordance with one or more embodiments of the invention that comprises a plurality of first layers 101, a plurality of second layers 109, and a plurality of first transitional layers 105 where each first transitional layer is disposed between and seamlessly connected to adjacent first and second layers 101, 109. As shown in FIG. 3, the 3D-printed article 300 may sequentially alternate between the first layer 101 and the second layer 109, with a first transitional layer 105 disposed between each first layer 101 and each second layer 109.

Figure 4:
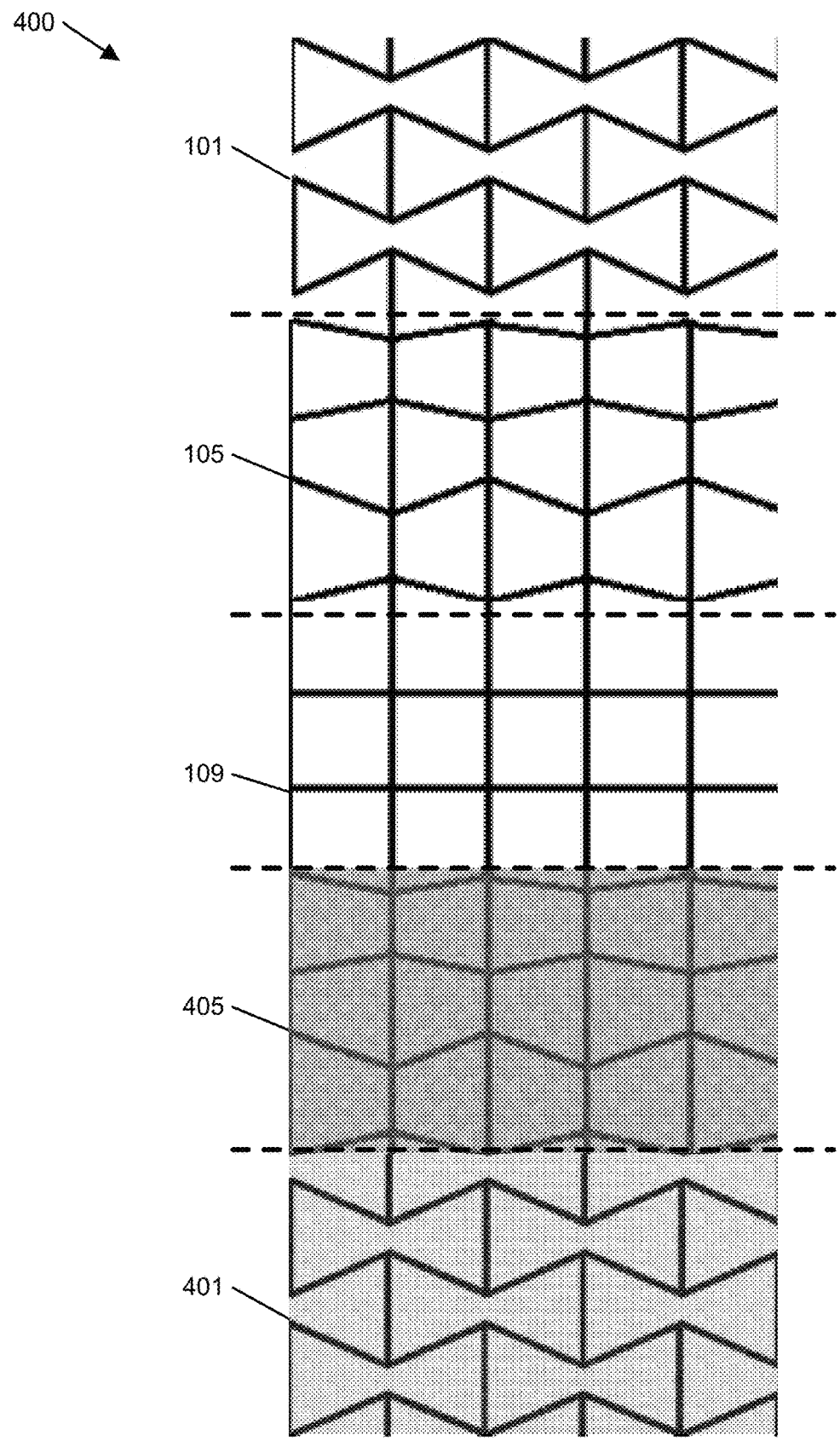
FIG. 4 shows a 3D-printed article in accordance with one or more embodiments of the invention.

FIG. 4 shows a 3D-printed article 400 in accordance with one or more embodiments of the invention that comprises a third layer 401 with a third metastructure that is structurally distinct from the first metastructure and the second metastructure. The 3D-printed article 400 may further comprise a second transitional layer 405 between the third layer 401 and the second layer 109. The second transitional layer 405 may comprise a second transitional metastructure that transitions from the second metastructure to the third metastructure. The connections from the second metastructure to the second transitional metastructure and from the second transitional metastructure to the third metastructure are seamless.

Figure 5:
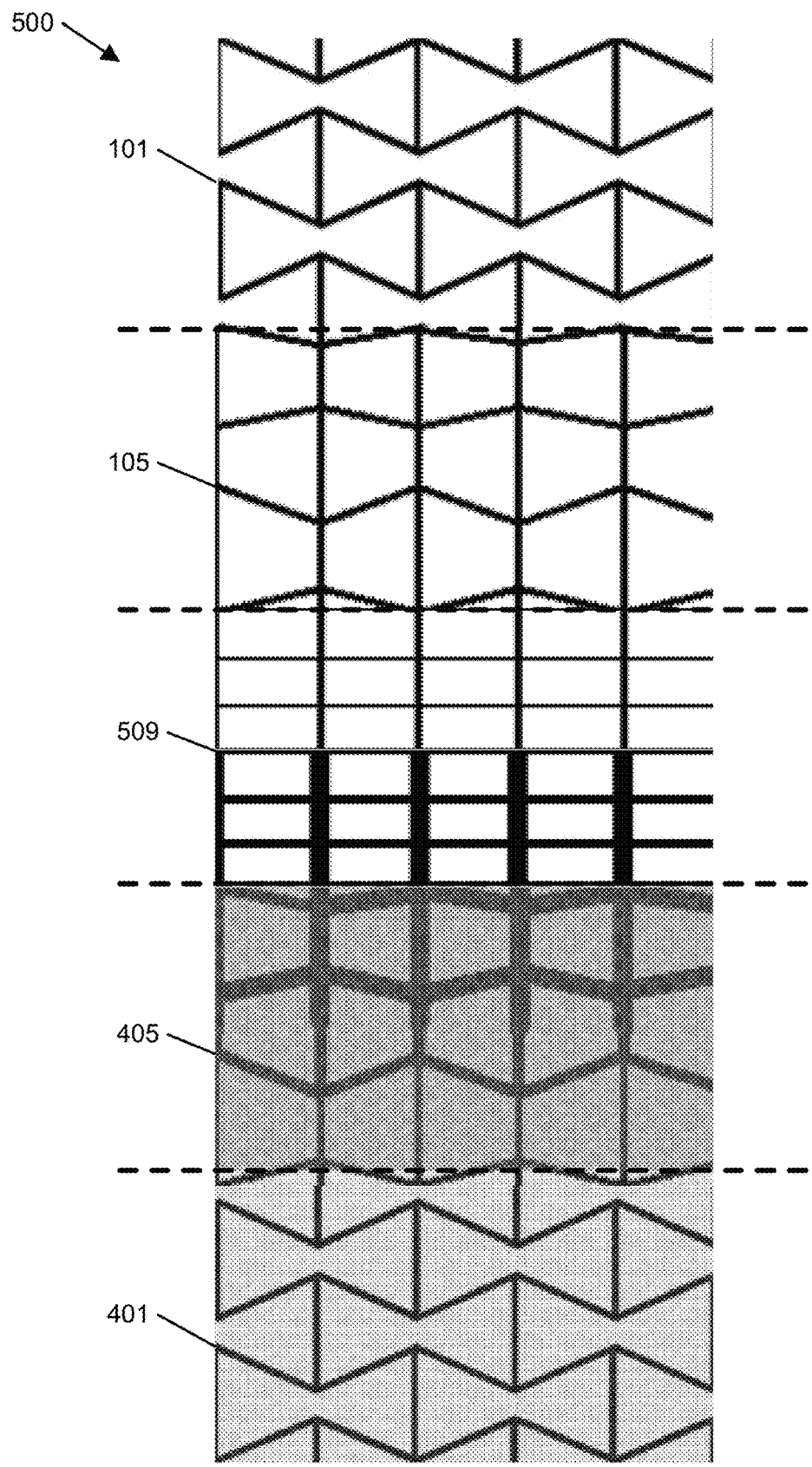
FIG. 5 shows a 3D-printed article in accordance with one or more embodiments of the invention.

FIG. 5 shows a 3D-printed article 500 in accordance with one or more embodiments of the invention that comprises a fourth layer 509, instead of the second layer 109, with a fourth metastructure (e.g., an acoustic metastructure) that includes at least two different internal structures. The fourth metastructure may comprise a first phononic bandgap structure and a second phononic bandgap structure. The first and second phononic bandgap structures may have different phononic response curves, allowing the 3D-printed article 500 to have complex acoustic properties (e.g., filtering out two different frequency bands). Thus, the first transitional metastructure of 3D-printed article 500 may transition from the first metastructure to a closer one of the first phononic bandgap structure and the second phononic bandgap structure. The second transitional metastructure may transition from the other of the first phononic bandgap structure and the second phononic bandgap structure to the third metastructure.

FIGS. 1-5 depict the first, first transitional, second, second transitional, and third metastructures with distinct patterns. However, the patterns shown in FIGS. 1-5 are merely for illustrative purposes, and the depicted metastructures are not limited to the patterns shown (e.g., rectilinear lattice, bowtie auxetic, transitional patterns). Furthermore, FIG. 5 depicts the first and second phononic bandgap structures with distinct patterns. However, the patterns shown in FIG. 5 are merely for illustrative purposes and the depicted structures are not limited to the patterns shown (e.g., rectilinear lattice).

Figure 6:
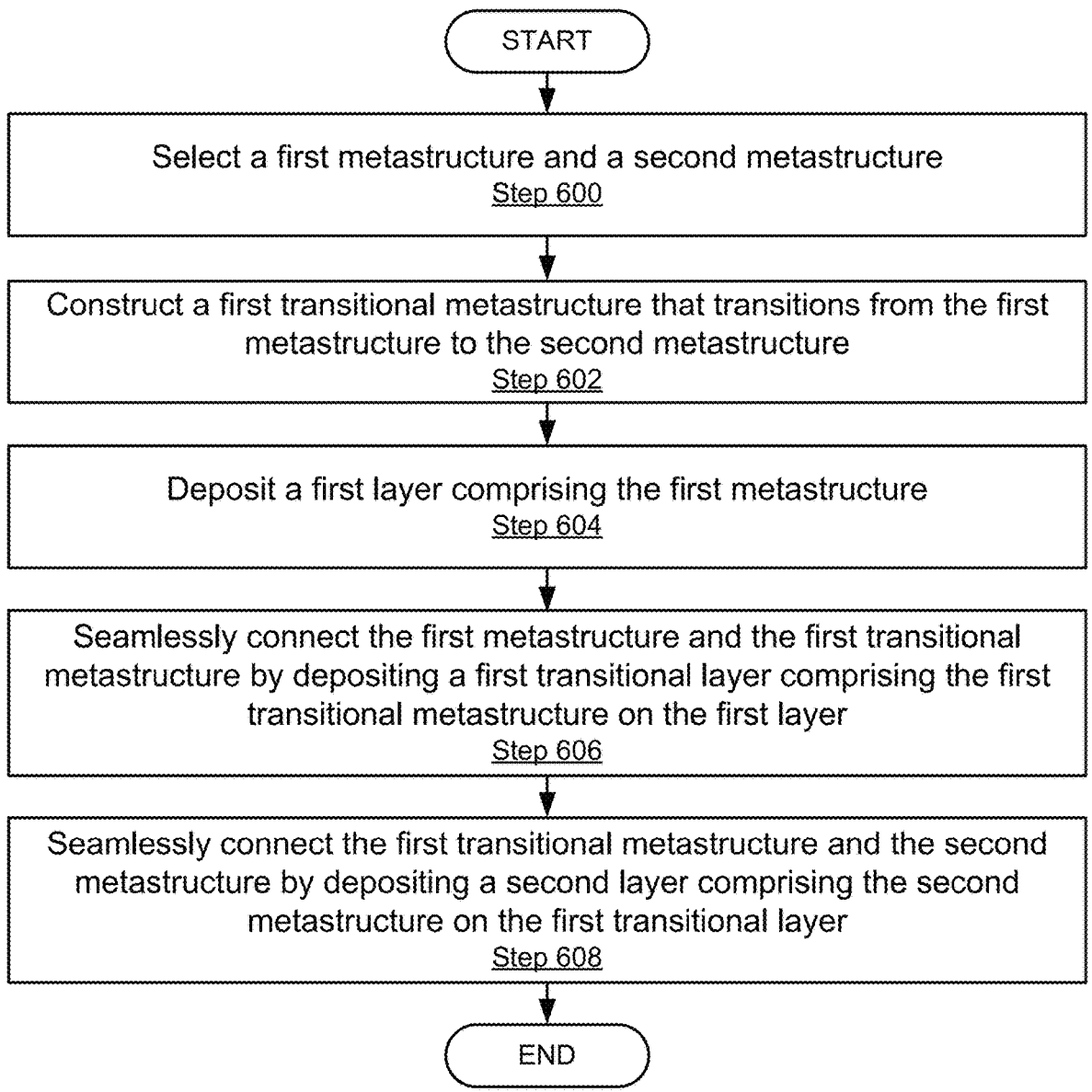
FIG. 6 shows a flowchart in accordance with one or more embodiments of the invention.
Figure 7:
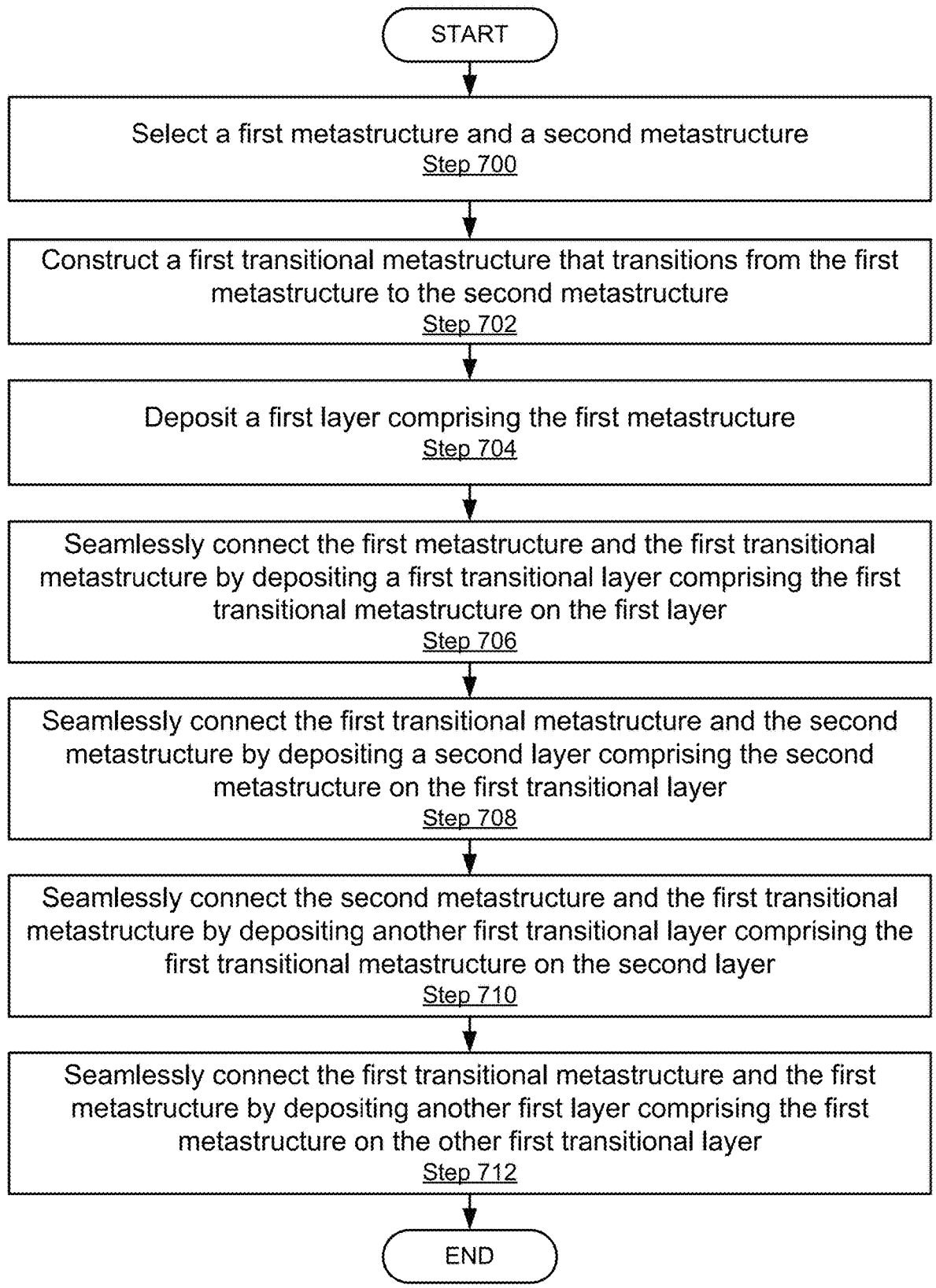
FIG. 7 shows a flowchart in accordance with one or more embodiments of the invention.
Figure 8:
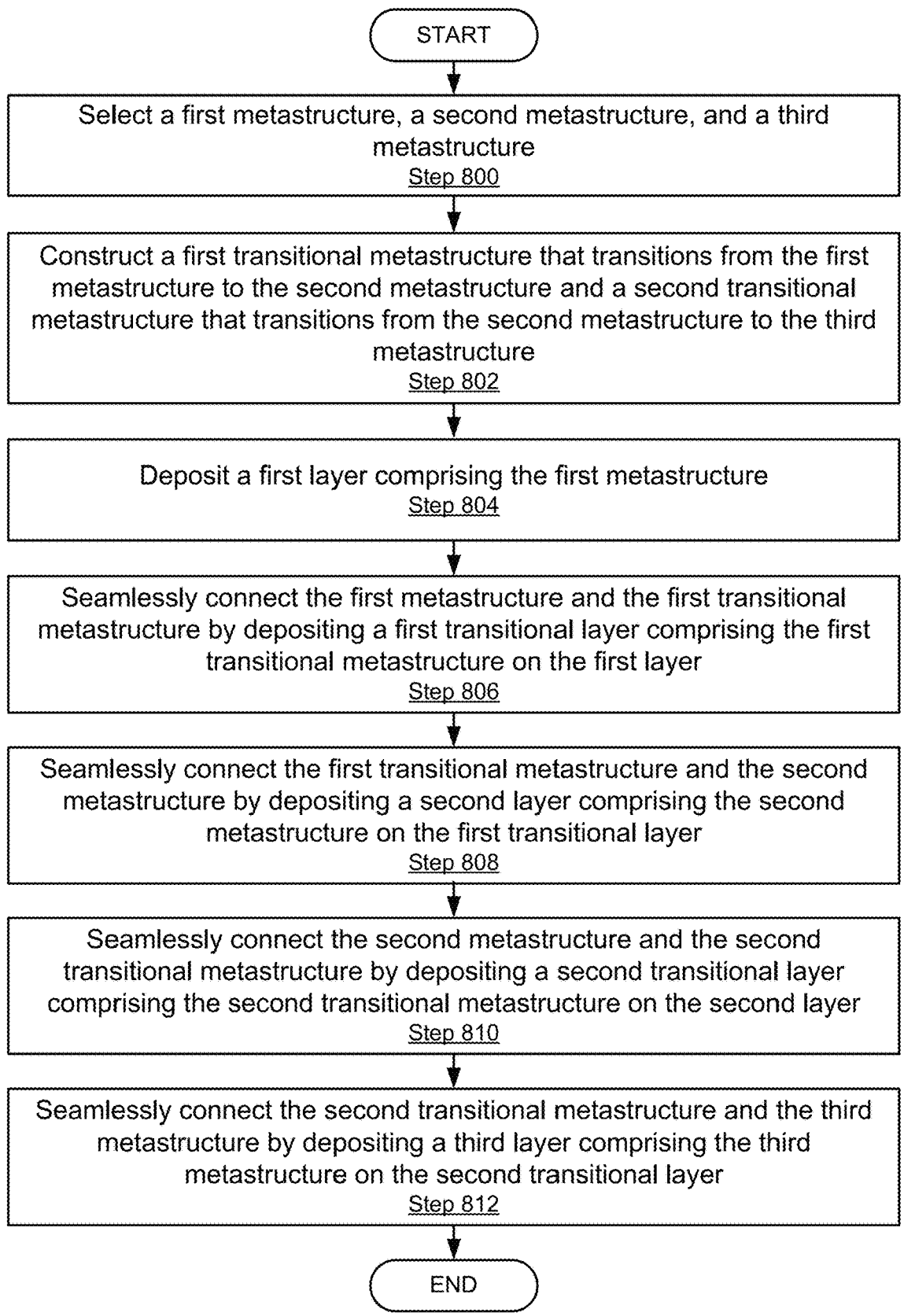
FIG. 8 shows a flowchart in accordance with one or more embodiments of the invention.

FIGS. 6-8 show flowcharts in accordance with one or more embodiments of the invention. The flowcharts depict a method for generating a 3D-printed article with transitional metastructures. In one or more embodiments of the invention, one or more of the steps shown in FIGS. 6-8 may be combined, omitted, repeated, and/or performed in a different order than the order shown in FIGS. 6-8. Accordingly, the scope of the invention should not be considered limited to the specific arrangement of steps shown in FIGS. 6-8.

FIG. 6 shows a flowchart for generating a 3D-printed article 100 in accordance with one or more embodiments of the invention.

Referring to FIG. 6, as discussed above in reference to FIG. 1, in STEP 600, a first metastructure and a second metastructure are selected.

In STEP 602, as discussed above in reference to FIG. 1, a first transitional metastructure that transitions from the first metastructure to the second metastructure is designed and constructed.

In one or more embodiments, the first transitional metastructure may be designed and constructed using machine learning based on parameters or characteristics of the first metastructure and the second metastructure (e.g., a volume fill factor, a material).

In STEP 604, as discussed in reference to FIG. 1, a first layer 101 comprising the first metastructure is deposited by a 3D printer.

In one or more embodiments, a metastructure or a layer may be designed, constructed (or converted) into a computer-aided design (CAD) file, and uploaded to the 3D printer before the first layer 101 is deposited. For example, prior to depositing the 3D-printed article 100, each layer of the 3D-printed article is converted and combined into a computer aided design (CAD) file as a single seamless 3D article and the CAD file is uploaded to a 3D printer.

In one or more embodiments, a 3D printer may comprise a solid filament extrusion and/or powder fusion additive manufacturing system. Materials commonly used in these solid additive manufacturing techniques may include solid thermoplastics (e.g., Acrylonitrile Butadiene Styrene (ABS), Polylactic acid (PLA), Polyethylene terephthalate (PET), Polycarbonate (PC), Nylon, Polypropylene (PP), Polyamides, Acrylonitrile styrene acrylate (ASA)), mixtures of thermoplastics, and composites with fillers (e.g., talc, metallic nanoparticles, carbon fibers, and carbon nanotubes). Alternatively, any suitable material for additive manufacturing may be used.

In one or more embodiments, a 3D printer may comprise a liquid resin additive manufacturing system (e.g., vat photopolymerization 3D printer, digital light processing printer). Materials used in liquid additive manufacturing techniques may include various photo-initiators, oligomers, and/or monomers. Alternatively, any suitable material for additive manufacturing may be used.

In STEP 606, as discussed above in reference to FIG. 1, the first metastructure and the first transitional metastructure are seamlessly connected by depositing a first transitional layer 105 comprising the first transitional metastructure on the first layer 101. The first transitional metastructure is seamlessly connected to the first metastructure, without disruption of the 3D-printing process, to create a seamless interface between the first layer 101 and the first transitional layer 105. In other words, there is no abrupt interface at the physical boundary between the first layer 101 and the adjacent first transition layer 105, and the first transitional layer 105 is formed on the first layer 101 in one continuous operation of the 3D-printing process.

In STEP 608, as discussed above in reference to FIG. 1, the first transitional metastructure and the second metastructure are seamlessly connected by depositing a second layer 109 comprising the second metastructure on the first transitional layer 105. The second metastructure is seamlessly connected to the first transitional metastructure, without disruption of the 3D-printing process, to create a seamless interface between the first transitional layer 105 and the second layer 109. In other words, there is no abrupt interface at the physical boundary between the first transitional layer 105 and the adjacent second layer 109, and the second layer 109 is formed on the first transitional layer 105 in one continuous motion of the 3D-printing process.

As a result, a 3D-printed article 100 with three metastructures may be fabricated by a single-step 3D-printing process.

In other words, the process of printing the 3D-printed article 100 is described using three steps (e.g., STEPs 604, 606, and 608) for illustrative purposes only, and the three steps are executed continuously as a single-step 3D-printing process.

In one or more embodiments, the first metastructure is a mechanically-strong auxetic metastructure and the second metastructure is an acoustic barrier, resulting in a lightweight and mechanically-strong sound barrier 3D-printer article 100.

FIG. 7 shows a flowchart for generating a 3D-printed article 300 in accordance with one or more embodiments of the invention.

Referring to FIG. 7, as discussed above in reference to FIG. 3, in STEP 700, a first metastructure and a second metastructure are selected.

In STEP 702, as discussed above in reference to FIG. 3, a first transitional metastructure that transitions from the first metastructure to the second metastructure is constructed.

In STEP 704, as discussed above in reference to FIG. 3, a first layer 101 comprising the first metastructure is deposited by a 3D printer.

In STEP 706, as discussed above in reference to FIG. 3, the first metastructure and the first transitional metastructure are seamlessly connected by depositing a first transitional layer 105 comprising the first transitional metastructure on the first layer 101. The first transitional metastructure is seamlessly connected to the first metastructure, without disruption of the 3D-printing process, to create a seamless interface between the first layer 101 and the first transitional layer 105. In other words, there is no abrupt interface at the physical boundary between the first layer 101 and the adjacent first transition layer 105, and the first transitional layer 105 is formed on the first layer 101 in one continuous operation of the 3D-printing process.

In STEP 708, as discussed above in reference to FIG. 3, the first transitional metastructure and the second metastructure are seamlessly connected by depositing a second layer 109 comprising the second metastructure on the first transitional layer 105. The second metastructure is seamlessly connected to the first transitional metastructure, without disruption of the 3D-printing process, to create a seamless interface between the first transitional layer 105 and the second layer 109. In other words, there is no abrupt interface at the physical boundary between the first transitional layer 105 and the adjacent second layer 109, and the second layer 109 is formed on the first transitional layer 105 in one continuous operation of the 3D-printing process.

In STEP 710, as discussed above in reference to FIG. 3, the second metastructure and the first transitional metastructure are seamlessly connected by depositing another first transitional layer 105 (i.e., a second iteration of the first transitional layer 105) comprising the first transitional metastructure on the second layer 109. The first transitional metastructure transitions from the second metastructure to the first metastructure. The first transitional metastructure is seamlessly connected to the second metastructure, without disruption of the 3D-printing process, to create a seamless interface between the second layer 109 and the other first transitional layer 105. In other words, there is no abrupt interface at the physical boundary between the second layer 109 and the adjacent other first transition layer 105, and the other first transitional layer 105 is formed on the second layer 109 in one continuous operation of the 3D-printing process.

In STEP 712, as discussed above in reference to FIG. 3, the first transitional metastructure and the first metastructure are seamlessly connected by depositing another first layer 101 (i.e., a second iteration of the first layer 101) comprising the first metastructure on the other first transitional layer 105. The first metastructure is seamlessly connected to the first transitional metastructure of the other first transitional layer 105, without disruption of the 3D-printing process, to create a seamless interface between the other first layer 101 and the another first transitional layer 105. In other words, there is no abrupt interface at the physical boundary between the other first transitional layer 105 and the adjacent other first layer 101, and the other first layer 101 is formed on the other first transitional layer 105 in one continuous operation of the 3D-printing process.

In one or more embodiments, STEPs 706-712 may be repeated to produce a 3D printed article 300 with a plurality of each of the three metastructures (i.e., the first, second, and first transitional metastructures).

Thus, a 3D-printed article 300 may be fabricated by a single-step 3D-printing process. In other words, the process of printing the 3D-printed article 300 is described using five steps (e.g., STEPs 704, 706, 708, 710, and 712) for illustrative purposes only, and the five steps are executed continuously as a single-step 3D-printing process.

FIG. 8 shows a flowchart for generating a 3D-printed article 400 in accordance with one or more embodiments of the invention.

Referring to FIG. 8, as discussed above in reference to FIG. 4, in STEP 700, a first metastructure, a second metastructure, and a third metastructure are selected.

In STEP 802, as discussed above in reference to FIG. 4, a first transitional metastructure that transitions from the first metastructure to the second metastructure and a second transitional metastructure that transitions from the second metastructure to the third metastructure are designed and constructed.

In STEP 804, as discussed above in reference to FIG. 4, a first layer 101 comprising the first metastructure is deposited by a 3D printer.

In STEP 806, as discussed above in reference to FIG. 4, the first metastructure and the first transitional metastructure are seamlessly connected by depositing a first transitional layer 105 comprising the first transitional metastructure on the first layer 101. The first transitional metastructure is seamlessly connected to the first metastructure, without disruption of the 3D-printing process, to create a seamless interface between the first layer 101 and the first transitional layer 105. In other words, there is no abrupt interface at the physical boundary between the first layer 101 and the adjacent first transition layer 105, and the first transitional layer 105 is formed on the first layer 101 in a one continuous operation of the 3D-printing process.

In STEP 808, as discussed above in reference to FIG. 4, the first transitional metastructure and the second metastructure are seamlessly connected by depositing a second layer 109 comprising the second metastructure on the first transitional layer 105. The second metastructure is seamlessly connected to the first transitional metastructure, without disruption of the 3D-printing process, to create a seamless interface between the first transitional layer 105 and the second layer 109. In other words, there is no abrupt interface at the physical boundary between the first transitional layer 105 and the adjacent second layer 109, and the second layer 109 is formed on the first transitional layer 105 in a one continuous operation of the 3D-printing process.

In STEP 810, as discussed above in reference to FIG. 4, the second metastructure and the second transitional metastructure are seamlessly connected by depositing a second transitional layer 405 comprising the second transitional metastructure on the second layer 109. The second transitional metastructure is seamlessly connected to the second metastructure, without disruption of the 3D-printing process, to create a seamless interface between the second layer 109 and the second transitional layer 405. In other words, there is no abrupt interface at the physical boundary between the second layer 109 and the adjacent second transition layer 405, and the second transitional layer 405 is formed on the second layer 109 in one continuous operation of the 3D-printing process.

In STEP 812, as discussed above in reference to FIG. 4, the second transitional metastructure and the third metastructure are seamlessly connected by depositing a third layer 401 comprising the third metastructure on the second transitional layer 405. The third metastructure is seamlessly connected to the second transitional metastructure, without disruption of the 3D-printing process, to create a seamless interface between the second transitional layer 405 and the third 401. In other words, there is no abrupt interface at the physical boundary between the second transitional layer 405 and the adjacent third layer 401, and the third layer 401 is formed on the second transitional layer 405 in one continuous operation of the 3D-printing process.

Thus, a 3D-printed article 400 with five metastructures (i.e., the first, second, third, first transitional, and second transitional metastructures) may be fabricated by a single-step 3D-printing process. In other words, the process of printing the 3D-printed article 400 is described using five steps (e.g., STEPs 804, 806, 808, 810, and 812) for illustrative purposes only and the five steps are executed continuously as a single-step 3D-printing process.

In one or more embodiments, as discussed above in reference to FIG. 5, a 3D-printed article 500 may comprise a fourth layer 509 with a fourth metastructure that includes a first phononic bandgap structure and a second phononic bandgap structure instead of the second layer 109. Accordingly, in STEP 808, the first transitional metastructure and the first phononic bandgap structure are seamlessly connected by depositing a fourth layer 509 comprising the first phononic bandgap structure on the first transitional layer 105. In other words, there is no abrupt interface at the physical boundary between the first transitional layer 105 and the adjacent fourth layer 509. The second phononic bandgap structure may be seamlessly connected to the first phononic bandgap structure.

Furthermore, in STEP 810, the second phononic bandgap structure and the second transitional metastructure are seamlessly connected by depositing a second transitional layer 405 comprising a second transitional metastructure that transitions from the second phononic bandgap structure to a third metastructure on the fourth layer 509. In other words, there is no abrupt interface at the physical boundary between the fourth layer 509 and the adjacent second transition layer 405.

In addition, in STEP 812, the second transitional metastructure and the third metastructure are seamlessly connected by depositing the third layer 401 on the second transitional layer 405. In other words, there is no abrupt interface at the physical boundary between the second transitional layer 405 and the adjacent third layer 401.

Figure 9:
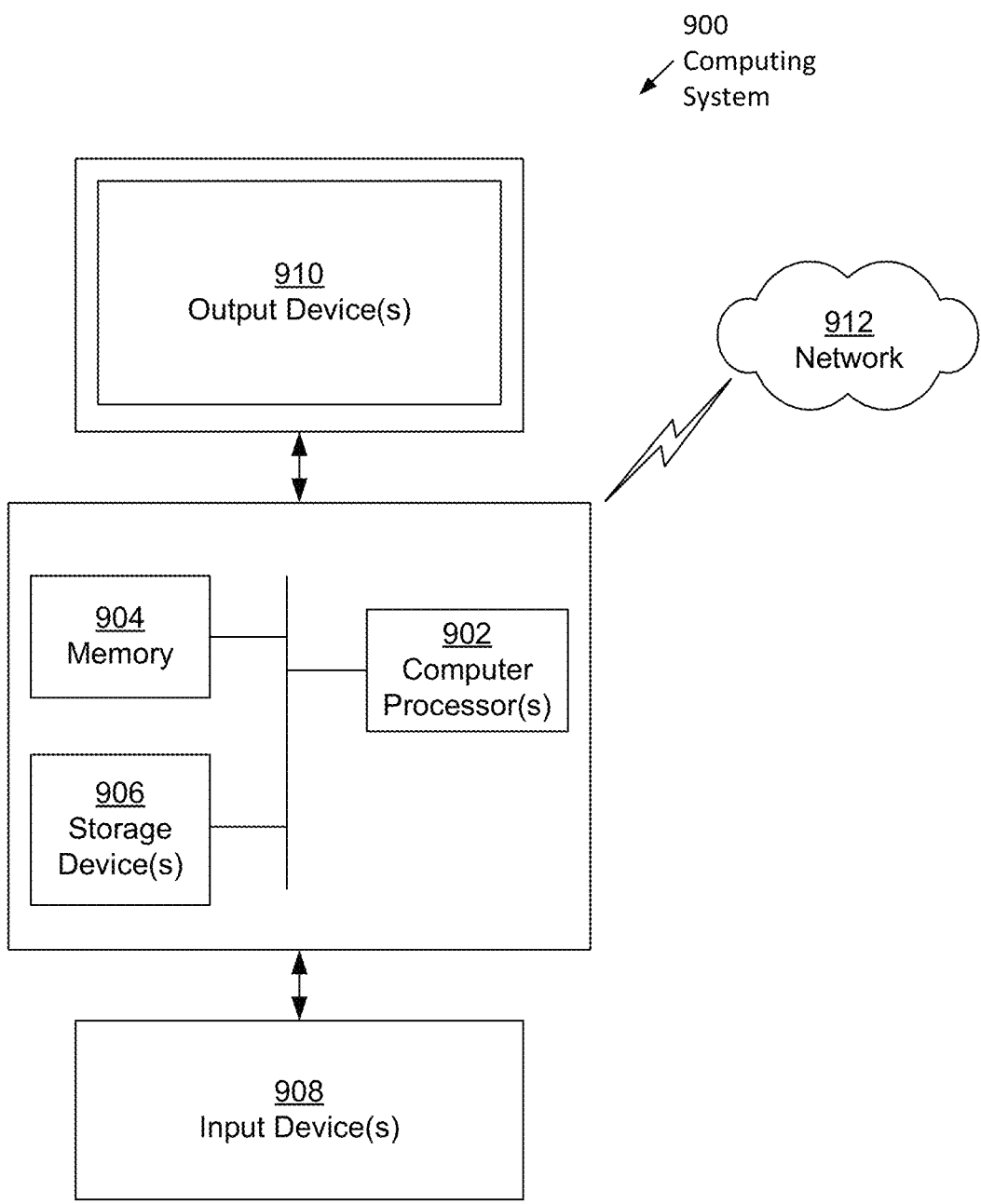
FIG. 9 shows a computing system in accordance with one or more embodiments of the invention.

The method of generating the 3D-printed structure of one or more embodiments may be implemented on virtually any type of computing system, regardless of the platform being used, that is connected to a 3D printer. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 9, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disk (CD) drive or digital versatile disk (DVD) drive, a flash memory stick, etc.), and numerous other elements and functionalities. The computer processor(s) (902) may be an integrated circuit for processing instructions. For example, the computer processor(s) may be one or more cores, or micro-cores of a processor including CPU (central processing unit), GPU (graphics processing unit), TPU (tensor processing unit), NPU (neural processing unit), and any suitable machine learning microprocessor that specializes in the acceleration of machine learning algorithms.

The computing system (900) may also include one or more input device(s) (908), such as a touchscreen, keyboard, mouse, microphone, touchpad, electronic pen, or any other type of input device. Further, the computing system (900) may include one or more output device(s) (910), such as a 3D printer, a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (912) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (900) may be located at a remote location and be connected to the other elements over a network (912). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more of the embodiments of the invention may have one or more of the following advantages: improved bonding (i.e., no abrupt transition interfaces) between layers (e.g., a mechanically-strong layer, an acoustic barrier layer, a cosmetic layer) of a 3D-printed article, reduction in delamination of layers of a 3D-printed article, stronger and thinner multilayered 3D-printed articles, decrease weight and volume of components on vehicles (e.g., automobiles, airplanes, boats), buildings, machinery, etc.; no additional processing in fabrication (e.g., lamination, bonding); optimized properties and characteristics in different layers (e.g., strength, rigidity, or other mechanical property in a mechanical layer, frequency response or other sound barrier property in an acoustic barrier layer); automated structural design (e.g., machine learning) to simultaneously optimize parameters (e.g., structure, fill factor, material, layer thickness, metastructure design) in different layers; and automate structural design of seamless transition layers.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A single-step method of generating a three dimensional (3D) printed article, the method comprising:
    selecting a first metastructure and a second metastructure;
    designing and constructing a first transitional metastructure that transitions from the first metastructure to the second metastructure;
    depositing a first layer comprising the first metastructure;
    seamlessly connecting the first and first transitional metastructures by depositing a first transitional layer comprising the first transitional metastructure on the first layer; and
    seamlessly connecting the first transitional and second metastructures by depositing a second layer comprising the second metastructure on the first transitional layer, wherein
    the first metastructure is an auxetic metastructure with a negative Poisson ratio, and
    the second metastructure is an acoustic metastructure comprising a first phononic bandgap structure.

2. The method of claim 1, wherein
    designing and constructing the first transitional metastructure uses machine learning based on a layer thickness, a volume fill factor, and materials of each of the first metastructure and the second metastructure.

3. The method of claim 2, wherein
    a minimum thickness of the first transitional metastructure is the highest prioritized parameter of the machine learning.

4. The method of claim 1, further comprising:
    depositing a plurality of first layers;
    depositing a plurality of second layers; and
    depositing a plurality of first transitional layers, wherein each first transitional layer is disposed between adjacent first and second layers, and
    the first transitional metastructure of each first transitional layer seamlessly connects to adjacent first and second metastructures.

5. The method of claim 1, further comprising:
    selecting a third metastructure;
    designing and constructing a second transitional metastructure that transitions from the second metastructure to the third metastructure;
    seamlessly connecting the second and second transitional metastructures by depositing a second transitional layer comprising the second transitional metastructure on the second layer; and
    seamlessly connecting the second transitional and third metastructures by depositing a third layer comprising the third metastructure on the second transitional layer.

6. The method of claim 1, wherein
    the second metastructure further comprises a second phononic bandgap structure, and
    the first transitional metastructure transitions from the first metastructure to a closer one of the first phononic bandgap structure and the second phononic bandgap structure.

7. The method of claim 1, wherein
    the first layer, the second layer, and the first transitional layer are connected without using post-processing lamination or post-processing bonding.

8. The method of claim 1, wherein
    the first layer, the second layer, and the first transitional layer are converted and combined into a computer aided design (CAD) file as a single seamless 3D article and the CAD file is uploaded to a 3D printer.

* * * * *